United States Patent [19]

Namba et al.

[11] Patent Number: 4,483,292
[45] Date of Patent: Nov. 20, 1984

[54] INTERNAL COMBUSTION ENGINE

[75] Inventors: Yuzuru Namba; Kenichi Aoyagi, both of Hamamatsu, Japan

[73] Assignee: Suzuki Jidosha Kogyo Kabushiki Kaisha, Japan

[21] Appl. No.: 303,125

[22] Filed: Sep. 17, 1981

[30] Foreign Application Priority Data

Sep. 29, 1980 [JP] Japan .................. 55-135603

[51] Int. Cl.³ .......................... F02M 35/10
[52] U.S. Cl. .......................... 123/308
[58] Field of Search ............ 123/52 MB, 188 M, 308, 123/432

[56] References Cited

U.S. PATENT DOCUMENTS 4,133,322  1/1979  Nakamura et al. ............ 123/308
4,271,802  6/1981  Hori et al. .................. 123/432

FOREIGN PATENT DOCUMENTS 0005305  1/1978  Japan ..................... 123/432
0072908  6/1978  Japan ..................... 123/432
0103913  8/1979  Japan ..................... 123/308
0156920 12/1979  Japan ..................... 123/308

Primary Examiner—Parshotam S. Lall
Assistant Examiner—W. R. Wolfe
Attorney, Agent, or Firm—Quaintance & Murphy

[57] ABSTRACT

An internal combustion engine, which is equipped with a sub-suction path for generating a swirl of the suction gas in the combustion chamber in addition to a main suction path to be opened or closed by a suction valve. The sub-suction path is equipped at its inlet side paths with two fuel supply device-line and atmosphere-line paths, the former of which is opened into the draft passage of a fuel supply device and between the air metering portion of said fuel supply device and a throttle valve downstream of the air metering portion and the latter of which is vented to the atmosphere while bypassing said air metering portion and said throttle valve. With the aforementioned atmosphere-line path, moreover, there is connected a vacuum-operated valve which is made operable in accordance with the vacuum prevailing downstream of said throttle valve.

1 Claim, 1 Drawing Figure

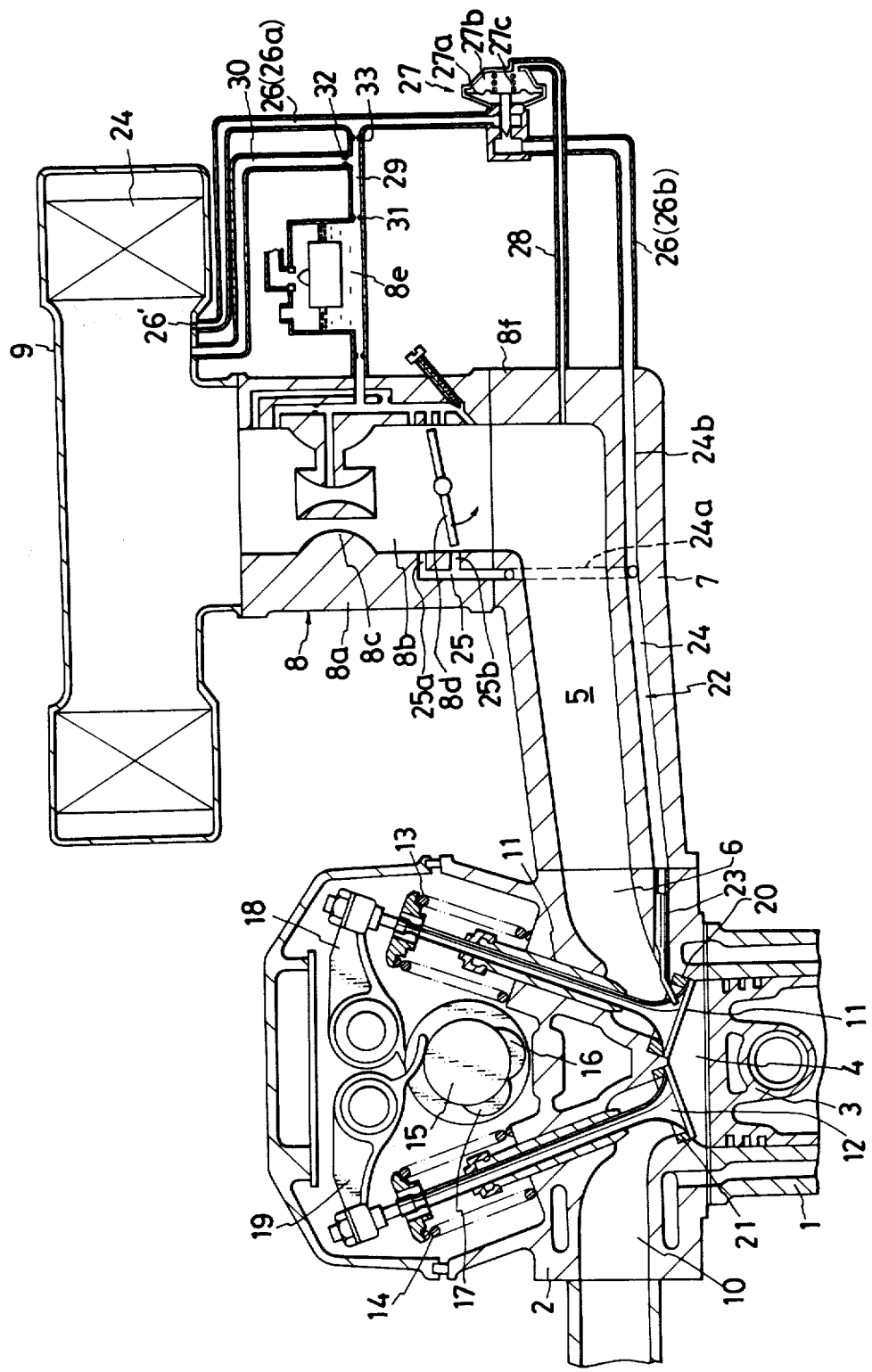

INTERNAL COMBUSTION ENGINE

FIELD OF THE INVENTION

The present invention relates to an internal combustion engine especially useful for automobiles. This internal combustion engine produces exhaust gases with reduced noxious gas content. Oxides of nitrogen are reduced. Furthermore, the rate of fuel consumption is improved.

DESCRIPTION OF THE PRIOR ART

At the present time, there is a great demand for internal combustion engines for automobiles which emit clean exhaust gas having a reduced amount of oxides of nitrogen but which internal combustion engines also have a desirably low rate of fuel consumption. Exhaust gas recirculation (EGR) and lean combustion are frequently provided in such engines. It is known that increasing the burning velocity will tend to prevent combustion fluctuations and will tend to prevent misfiring in engines equipped with exhaust gas recirculation which also employ lean combustion.

In order to increase the burning velocity, there has been recently proposed several suction systems in which a sub-suction path is provided separately from the main suction path. The sub-suction path injects a gas into the combustion chamber, thereby generating a swirl of the gases in the combustion chamber.

However, internal combustion engines having such a sub-suction path are not presently satisfactory.

SUMMARY OF THE INVENTION

It is therefore a primary object of the present invention to provide an improved internal combustion engine having a sub-suction path substantially free of the problems of prior engines.

Another object is to provide an improved internal combustion engine substantially free of misfiring during deceleration.

Another object of the present invention is to provide an improved internal combustion engine producing exhaust gas having a reduced hydrocarbon content.

Yet another object of the present invention is to provide an improved internal combustion engine producing exhaust gases having a reduced content of oxides of nitrogen.

Yet another object of the present invention is to provide an internal combustion engine in which the air-fuel ratio can be finely controlled.

Still another object of the present invention is to provide an improved internal combustion engine which is substantially free of misfiring during deceleration at low running rates and at intermediate running rates when such engine is equipped with exhaust gas recirculation.

The above and other objects are accomplished according to the present invention by providing an internal combustion engine comprising a combustion chamber, a fuel supply device, a main suction path, and a sub-suction path. The combustion chamber has a suction valve and a piston operable to make a suction stroke. The fuel supply device has a draft passage comprising an air-metering portion and a throttle valve downstream of the air-metering portion. The main suction path connects the fuel supply device with the combustion chamber. The sub-suction path is separate from the main suction path and comprises a downstream portion as well as first and second upstream portions. The outlet of the downstream portion creates a swirl of gases in the combustion chamber. The inlet of the downstream portion is in fluid communication with the outlet of the first upstream portion. It is also in fluid communication with the outlet of the second upstream portion. The inlet of the first upstream portion is in fluid communication with the draft passage at a point between its air-metering portion and its throttle valve. The inlet of the second upstream branch is vented to the atmosphere. The second upstream branch has a vacuum operated valve responsive to the vacuum in the main suction path at a point downstream of the throttle valve. In the engine of the present invention, the gas to be introduced into the sub-suction path is solely made to flow through the air-metering portion of the fuel supply device during operations other than deceleration. In this manner, a finely controlled air-fuel ratio can be attained. During deceleration, on the other hand, the gas is sucked directly from the atmosphere such that misfiring is reliably prevented.

BRIEF DESCRIPTION OF THE DRAWING

The single figure of the drawing is a sectional view showing significant elements of the internal combustion engine of the present invention.

DESCRIPTION OF THE PREFERRED EMBODIMENT

Referring now to the single figure of the drawing, there is shown an internal combustion engine of the present invention. The internal combustion engine has a cylinder 1 attached to a cylinder head 2 having a piston 3 operable therein. The cylinder 1, cylinder head 2 and piston 3 define a combustion chamber 4 into which a main suction path is opened. The main suction path 5 has a serial passage which leads from a suction port 6 formed in the cylinder head 2 via a suction manifold 7 and a carburetor 8. The carburetor 8 constitutes a fuel supply device. An air cleaner 9 is mounted on the carburetor 8. The suction port 6 is oriented in a direction to generate a swirl of gases in the combustion chamber 4. This swirl of gases turns centering around the axis of the cylinder 1. The swirling direction is predetermined such that the air-fuel mixture supplied from the suction port 6 will flow into an exhaust port 10 after it has swept an ignition plug (not shown). The ports 6 and 10 are opened or closed by the actions of a suction valve 11 and an exhaust valve 12 respectively. The valves 11 and 12 are opened and closed by the action of an opening control mechanism. The opening control mechanism comprises return springs 13 and 14, cams 16 and 17, driven by a camshaft 15 as well as rocker arms 18 and 19. The valves 11 and 12 are seated upon their respective valve seats 20 and 21 when the valves are closed.

The sub-suction path 22 has a smaller effective opening area than does the main suction path 5. The outlet of the sub-suction path 22 constitutes a pipe 23. The extreme outlet of the pipe 23 is in the form of an injection nozzle. The pipe 23 is embedded in the cylinder head 2. The sub-suction path 22 can be divided into a single downstream portion 24 and two upstream portions 24a and 24b. The inlet of the downstream portion 24 is coincidental with the outlets of the first upstream portion 24a and the second upstream portion 24b.

The first upstream portion 24a forms a part of the passage of the carburetor-line path and may act as a fuel supply device. The second upstream portion 24b forms a part of the atmosphere line path. The first upstream portion 24a comprises a path 25 which is formed in the body 8a of the carburetor 8. The path 25 itself is divided midway into two branches which open into the carburetor. The first such branch is designated an upstream portion 25a whereas the second branch is designated as a downstream portion 25b. Both open into the draft passage 8b of the carburetor 8. The inlets 25a and 25b are spaced from each other in the flow direction of the draft passage 8b such that the upstream inlet 25a is always open between the venturi 8c and the throttle valve 8d. On the other hand, the downstream inlet 25b is opened and closed by the throttle valve 8d.

The second upstream portion 24b is itself branched and is connected to the air cleaner 9. In other words, it is vented to the atmosphere since the path 26 bypasses both the venturi 8c and the throttle 8d of the carburetor 8. The atmospheric vent of the second portion 24b is designated 26'. A vacuum operated valve 27 is located in the second upstream portion 24b. The valve 27 divides the second upstream portion 24b into an upstream porton 26a and a downstream portion 26b. The vacuum operated valve 27 has a vacuum chamber 27b which is defined by a diaphram 27a. The vacuum chamber 27b is in fluid communication with a vacuum signal line 28, the inlet of which is in fluid communication with the main suction path 5 at a point downstream of the throttle valve 8d. The vacuum valve 27 is normally closed by the action of a return spring 27c. The vacuum valve 27 is opened when the diaphram 27a compresses the return spring 27c. This action occurs when the vacuum in the vacuum chamber 27b is increased. The degree of vacuum required to open the vacuum operated valve 27 is set equal to the vacuum generated in the main suction path 5 during deceleration.

When the vacuum operated valve 27 is opened, the path 26, i.e., the path 26a, is supplied with fuel in the form of an air-fuel mixture. The float chamber 8e of the carburetor 8 is connected via a fuel-supply path 29 to the path 26a.

The fuel supply path 29 and the air cleaner 9 are connected via an air supply path 30. The system is provided with three jets 31, 32, 33. The jet 31 meters the fuel coming from the float chamber 8e. The jet 32 meters the air from the path 30. The jet 33 meters the air-fuel mixture as has its air-fuel ratio set at a predetermined value by the coactions of the two jets 31 and 32.

Exhaust gas is recirculated from the exhaust system via an EGR valve into the main suction path 5. However, since the construction of that portion of the system is similar to that of the prior art, it is unnecessary for an understanding of the present invention and it is therefore omitted from the drawing.

The engine of the present invention functions as follows.

First of all, in low-and intermediate-load running ranges, the throttle valve 8d has a relatively small opening. Since, under such conditions, the vacuum in the suction manifold 7 is sufficiently lower than that during deceleration, the vacuum-operated valve 27 is closed. During the suction stroke, on the other hand, since the pressure differential between the outlet end 23 of the sub-suction path 22 and the carburetor-line inlet ends 25a, 25b becomes remarkably high, the gas is injected at a remarkably high velocity from the sub-suction path 22 into the combustion chamber 4 so that an intense swirl of the suction gas is generated in the combustion chamber 4. As a result, the burning velocity is accelerated so that lean combustion can be stably sustained even with a high exhaust gas recirculation rate.

Second, during the idling operation, since one carburetor-line inlet end 25b is closed by the throttle valve 8d, the gas is sucked only from the other inlet end 25a into the sub-suction path 22 so that the gas injection rate from said sub-suction path 22 is reduced. During idling, since fuel is supplied from the carburetor 8 solely through idle port 8f, a low gas injection rate is preferred.

Third, during the deceleration, since the engine is running at a high speed with the throttle valve 8d closed, the vacuum in the suction manifold 7 is so great that the vacuum-operated valve 27 is opened. The gas is then sucked into the sub-suction path 22 not only from the inlet 25a but also from the atmosphere-line inlet 26' so that the gas injection rate from said sub-suction path 22 into the combustion chamber 4 is increased. Thus, it is possible to prevent misfiring which is otherwise prone to take place during deceleration. Furthermore, the hydrocarbon content of the exhaust gas is reduced. In order to further inhibit misfiring during deceleration, it is preferred that the fuel or an air-fuel mixture be supplied to the atmosphere-line path 26. Taking the improvement in the rate of fuel consumption into consideration, it is also possible to cut off the fuel supply to the atmosphere-line path 26.

In the running ranges other than deceleration, since the flow rate of the air to be sucked into the combustion chamber 4 is wholly metered through the venturi 8c, a proper air-fuel ratio is preferably realized.

Although the foregoing description refers to a preferred embodiment, the present invention should not be limited thereto but can include the following modifications:

First, the outlet of the sub-suction path may open directly into the combustion chamber, and an opening control valve, opened during the suction stroke, can be separately provided in the sub-suction path.

Second, the sub-suction path may be formed with either of the carburetor-line inlet ends 25a and 25b.

Third, the present invention can also be used with multi-or single-cylinder engines which are not equipped with a suction manifold.

Fourth, the atmosphere-line inlet of the sub-suction path may be connected to either the inside of the draft passage of the carburetor upstream of the venturi or to an auxiliary air cleaner which is provided separately and indepehdently of the carburetor air cleaner.

Fifth, the carburetor can be of two-barrel type, and in this case the carburetor-line path of the sub-suction path can be opened into the primary draft passage of the two-barrell carburetor.

Sixth, the fuel supply device can be something other than a carburetor such as an electronically controlled fuel injection device. In other words, the fuel supply device-line path of the sub-suction path may be opened between an air flow meter acting as the air metering portion of the injection type fuel supply device and the throttle valve disposed downstream thereof.

Still other modifications will be apparent to those of ordinary skill in the art without departing from the spirit of the invention as described above and as claimed below.

What is claimed is:

1. An internal combustion engine comprising:

A. a combustion chamber having a suction valve and a piston operable to make a suction stroke in the combustion chamber; and B. a fuel supply device having a draft passage comprising an air metering portion and a throttle valve downstream of the air metering portion; and C. a main suction path connecting the fuel supply device with the combustion chamber; and D. a sub-suction path separate from the main suction path; said sub-suction path comprising a downstream portion and a first upstream portion and a second upstream portion; wherein
  (1) an outlet of the downstream portion constitutes means for creating a swirl of gases in the combustion chamber; and
  (2) an inlet of the downstream portion is in fluid communication with an outlet of the first upstream portion and is in fluid communication with an outlet of the second upstream portion; and
  (3) an inlet of the first upstream portion is in fluid communication with the draft passage at a point between its air metering portion and its throttle valve; and wherein said second upstream portion of the sub-suction path comprises:
  (4) a first conduit having an inlet and an outlet, wherein its outlet is in fluid communication with the inlet of the downstream portion of the sub-suction path; and
  (5) a vacuum-operated valve responsive to a vacuum in the main suction path at a point downstream of the throttle valve; said vacuum-operated valve having an inlet and an outlet wherein its outlet is in fluid communication with the inlet of the first conduit; and
  (6) a second conduit having an inlet and outlet wherein its outlet is in fluid communication with the inlet of the vacuum-operated valve; and
  (7) a third conduit having an inlet and an outlet wherein its outlet is in fluid communication with the inlet of the second conduit; and wherein its inlet is in fluid communication with an air cleaner; and
  (8) a fourth conduit having an inlet and an outlet and a flow-restricting jet within the fourth conduit between the inlet and the outlet wherein its outlet is in fluid communication with the inlet of the second conduit; and
  (9) a fifth conduit having an inlet and an outlet and having a flow-restricting jet between its inlet and its outlet; wherein its outlet is in fluid communication with the inlet of the fourth conduit; and
  (10) a sixth conduit having an inlet and an outlet and having a flow-restricting jet within the sixth conduit between the inlet and the outlet wherein its outlet is in fluid communication with the inlet of the fourth conduit; and
  (11) a float chamber containing fuel wherein the float chamber is in fluid communication with the inlet of the sixth conduit whereby when the vacuum-operated valve senses sub-atmospheric pressure at a point in the main suction path downstream of the throttle valve that this sub-atmospheric pressure causes opening of the vacuum-operated valve causing fuel to flow from the float chamber through the sixth conduit to the inlet of the fourth conduit whereupon fuel in the sixth conduit is mixed with air from the fifth conduit whereby producing a fuel-air mixture which enters the inlet of the second conduit at which point it is mixed with additional air from the third conduit which fuel-air mixture then passes through the vacuum-operated valve and through the first conduit into the inlet of the downstream portion of the sub-suction path where it is mixed with a different fuel-air mixture from the second upstream portion of the sub-suction path wherein said combined fuel-air mixture passes through the outlet of the downstream portion and causes a swirl of gases in the combustion chamber.

* * * * *